(12) United States Patent
Yang et al.

(10) Patent No.: US 7,936,087 B2
(45) Date of Patent: May 3, 2011

(54) SWITCHING CONTROLLER FOR PARALLEL POWER CONVERTERS

(75) Inventors: Ta-yung Yang, Milpitas, CA (US);
Rui-Hong Lu, Chia-I County (TW);
Jenn-Yu G. Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 187 days.

(21) Appl. No.: 11/684,642

(22) Filed: Mar. 12, 2007

(65) Prior Publication Data
US 2008/0225560 A1 Sep. 18, 2008

(51) Int. Cl.
*H01H 7/00* (2006.01)

(52) U.S. Cl. ........... 307/11; 307/31; 307/38; 307/112; 307/113; 307/116; 307/125; 307/131; 307/139

(58) Field of Classification Search ............ 307/11, 307/31, 38, 112–113, 116, 125, 131, 139
See application file for complete search history.

(56) References Cited

U.S. PATENT DOCUMENTS

| | | | | |
|---|---|---|---|---|
| 5,335,162 A * | 8/1994 | Martin-Lopez et al. | ........ | 363/97 |
| 5,612,610 A * | 3/1997 | Borghi et al. | ......... | 323/222 |
| 5,614,855 A * | 3/1997 | Lee et al. | ......... | 327/158 |
| 5,745,352 A * | 4/1998 | Sandri et al. | ......... | 363/41 |
| 5,859,768 A * | 1/1999 | Hall et al. | ......... | 363/21.13 |
| 5,903,452 A * | 5/1999 | Yang | ......... | 363/97 |
| 5,978,195 A * | 11/1999 | Goder et al. | ......... | 361/94 |
| 6,046,618 A * | 4/2000 | Lee | ......... | 327/236 |
| 6,246,222 B1 * | 6/2001 | Nilles et al. | ......... | 323/283 |
| 6,278,263 B1 | 8/2001 | Walters et al. | | |
| 6,404,175 B1 | 6/2002 | Yang et al. | | |
| 6,459,602 B1 * | 10/2002 | Lipcsei | ......... | 363/132 |
| 6,611,439 B1 * | 8/2003 | Yang et al. | ......... | 363/41 |
| 6,625,242 B1 * | 9/2003 | Yoo et al. | ......... | 375/376 |
| 6,674,656 B1 * | 1/2004 | Yang et al. | ......... | 363/21.1 |
| 6,844,710 B2 * | 1/2005 | Lipcsei et al. | ......... | 323/284 |
| 6,903,537 B2 * | 6/2005 | Tzeng et al. | ......... | 323/268 |
| 6,954,367 B2 * | 10/2005 | Yang et al. | ......... | 363/98 |
| 6,965,221 B2 * | 11/2005 | Lipcsei et al. | ......... | 323/283 |
| 7,158,392 B2 * | 1/2007 | Hosokawa et al. | ......... | 363/21.06 |
| 7,170,272 B2 * | 1/2007 | Yoshida | ......... | 323/284 |
| 7,215,102 B2 * | 5/2007 | Harris et al. | ......... | 323/268 |
| 7,265,522 B2 * | 9/2007 | Sutardja et al. | ......... | 323/222 |
| 7,301,314 B2 * | 11/2007 | Schuellein et al. | ......... | 323/272 |
| 7,365,997 B2 * | 4/2008 | Chen et al. | ......... | 363/21.1 |
| 7,368,959 B1 * | 5/2008 | Xu et al. | ......... | 327/141 |

(Continued)

OTHER PUBLICATIONS

"Office Action of Taiwan Counterpart Application", issued on Jul. 29, 2010, p1-p7, in which the listed reference was cited.

*Primary Examiner* — Jared J Fureman
*Assistant Examiner* — Adi Amrany
(74) *Attorney, Agent, or Firm* — Jianq Chyun IP Office

(57) ABSTRACT

A switching controller for parallel power converters is disclosed. The switching controller includes an input circuit coupled to an input terminal of the switching controller to receive an input signal. An integration circuit is coupled to the input circuit to generate an integration signal in response to the pulse width of the input signal. A control circuit generates a switching signal for switching the power converters. The switching signal is enabled in response to the enabling of the input signal. A programmable delay time is generated between the input signal and the switching signal. The pulse width of the switching signal is determined in response to the integration signal.

7 Claims, 4 Drawing Sheets

U.S. PATENT DOCUMENTS

| | | | |
|---|---|---|---|
| 7,378,822 B2 * | 5/2008 | Liao | 323/222 |
| 7,468,896 B2 * | 12/2008 | Gong et al. | 363/21.17 |
| 7,764,519 B2 * | 7/2010 | Sugahara | 363/21.12 |
| 2004/0136209 A1 * | 7/2004 | Hosokawa et al. | 363/24 |
| 2005/0052163 A1 | 3/2005 | Sutardja et al. | |
| 2007/0263617 A1 * | 11/2007 | Takemura | 370/360 |
| 2008/0100277 A1 * | 5/2008 | Yang | 323/318 |
| 2008/0144343 A1 * | 6/2008 | Yang | 363/78 |
| 2008/0174293 A1 * | 7/2008 | Yang | 323/298 |
| 2008/0175026 A1 * | 7/2008 | Yang | 363/21.15 |
| 2008/0198636 A1 * | 8/2008 | Yang et al. | 363/41 |
| 2008/0225560 A1 * | 9/2008 | Yang et al. | 363/71 |

* cited by examiner

SWITCHING CONTROLLER FOR PARALLEL POWER CONVERTERS

BACKGROUND OF THE INVENTION

1. Field of the Invention

The present invention relates to a power converter, and more particularly to a control circuit of switching power converters.

2. Description of the Related Art

The high current demand normally decreases the power efficiency in the power converter. The power loss of the power converter is exponentially proportional to its current.

$$P_{LOSS}=I^2 \times R \quad (1)$$

where I is the switching current of the power converter; and R is the impedance of the switching devices such as the resistance of the inductor and the transistor, etc. Therefore, parallel technologies had been developed to reduce the power consumption of high current power converters in recent development. Such as "Multi-phase converter with balanced currents" by Walters et al., U.S. Pat. No. 6,278,263; "Multi-phase and multi-module power supplies with balanced current between phases and modules" by Yang et al., U.S. Pat. No. 6,404,175. However, the problem of these prior arts is extra power losses caused by the current measurement of the current balance. Another disadvantage of prior arts is the inflexibility of parallel power channels. The object of present invention is to overcome foregoing problems. A switching controller is developed for the parallel of power converters. The number of parallel channels is not limited theoretically. Synchronization and phase shift of the switching are designed to spread the switching noise and reduce the ripple. Power sharing technology is used to replace the current balance. No current measurement is needed, which simplifies the control circuit and improves the efficiency of power converters.

SUMMARY OF THE INVENTION

The present invention provides a switching controller with power sharing capability to parallel power converters. The pulse width of the switching signal will follow the pulse width of an input signal. The input signal is the switching signal of the previous power converter. A programmable delay time is generated between the enabling of the input signal and the enabling of the switching signal for the synchronization and phase shift. The switching controller includes an input circuit to receive an input signal for generating a phase-shift signal. A resistor determines a delay time in between the enabling of the input signal and the enabling of the phase-shift signal. An integration circuit is coupled to the input circuit to generate an integration signal in accordance with the pulse width of the input signal. A control circuit is utilized to generate the switching signal for switching the power converter. The pulse width of the switching signal is determined in accordance with the level of the integration signal. The level of the integration signal is generated which is proportional to the pulse width of the input signal. The pulse width of the switching signal is also produced which is proportional to the level of the integration signal. The pulse width of the switching signal is therefore correlated to the pulse width of the input signal to achieve the power sharing. The switching signal is disabled once the integration signal is lower than a threshold for power saving at light load. Furthermore, the maximum on time of the switching signal is limited for the protection of power converter.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
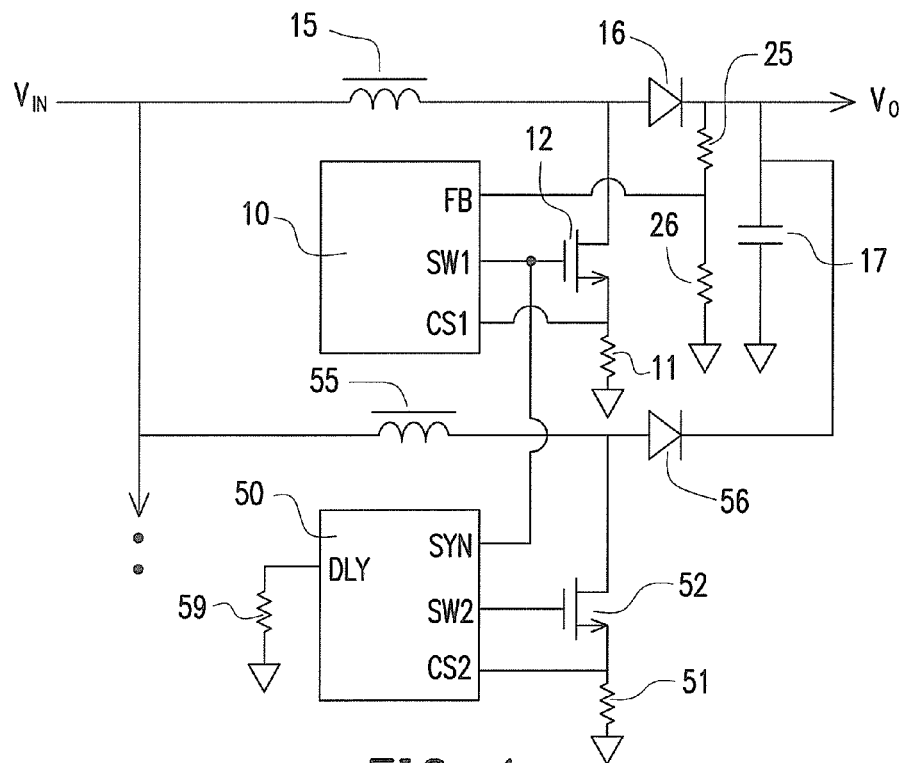
FIG. 1 shows an example of parallel power converters according to the present invention.

FIG. 1 shows an embodiment of parallel power converters according to the present invention. A switching controller 10, a transistor 12, an inductor 15 and a rectifier 16 form a first power converter. The output terminal SW1 of the switching controller 10 is coupled to control the transistor 12 for switching the inductor 15. The rectifier 16 and a capacitor 17 are connected to generate the output of the power converter at the output terminal $V_O$. Another switching controller 50, a transistor 52, an inductor 55 and a rectifier 56 form another power converter coupled to the output terminal $V_O$. The outputs of power converters are connected in parallel. The inductor 15 is coupled to an input of the power converter at the input terminal $V_{IN}$. When the transistor 12 is turned on, a switching current $I_{10}$ is generated, which may be expressed by:

$$I_{10} = \frac{V_{IN}}{L_{15}} \times T_{ON-10} \quad (2)$$

where the $L_{15}$ is the inductance of the inductor 15; $T_{ON-10}$ is the on time of the switching signal of the switching controller 10; and $V_{IN}$ is the voltage of the input terminal $V_{IN}$.

The feedback terminal FB of the switching controller 10 is coupled to the output terminal $V_O$ through resistors 25 and 26 for regulating the power converter. A current-sense terminal CS1 of the switching controller 10 is connected to a resistor 11 to sense the switching current of transistor 12. Another current-sense terminal CS2 of the switching controller 50 is also coupled to a resistor 51 to sense the switching current of transistor 52. The output terminal SW1 of the switching controller 10 is tied to the input terminal SYN of the switching controller 50. A resistor 59 is connected from the switching controller 50 to the ground to determine a delay time between switching signals of switching controllers 10 and 50. The switching controller 10 is operated as a master controller. The switching controller 50 is activated as slave controller. The output of power converters is connected to the output VO. Slave controllers can be connected as a daisy chain for the synchronization and power sharing. The on time and the switching period of slave controllers will follow the on time and the switching period of the master controller.

The output power $P_O$ of the power converter can be expressed as, $$P_O = V_O \times I_O \quad (3)$$

$$P_O = V_O \times (I_{10} + \ldots + I_{50}) \quad (4)$$

$$I_{50} = \frac{V_{IN}}{L_{55}} \times T_{ON-50} \quad (5)$$

where $L_{55}$ is the inductance of the inductor 55; $T_{ON-50}$ is the on time of the switching controller 50.

The on time and the switching period of the slave controllers are designed to be equal to the on time $T_{ON}$ and the switching period T of the master controller. If the inductance of inductors is equal, then the output current of the power converter will be the same.

Figure 2:
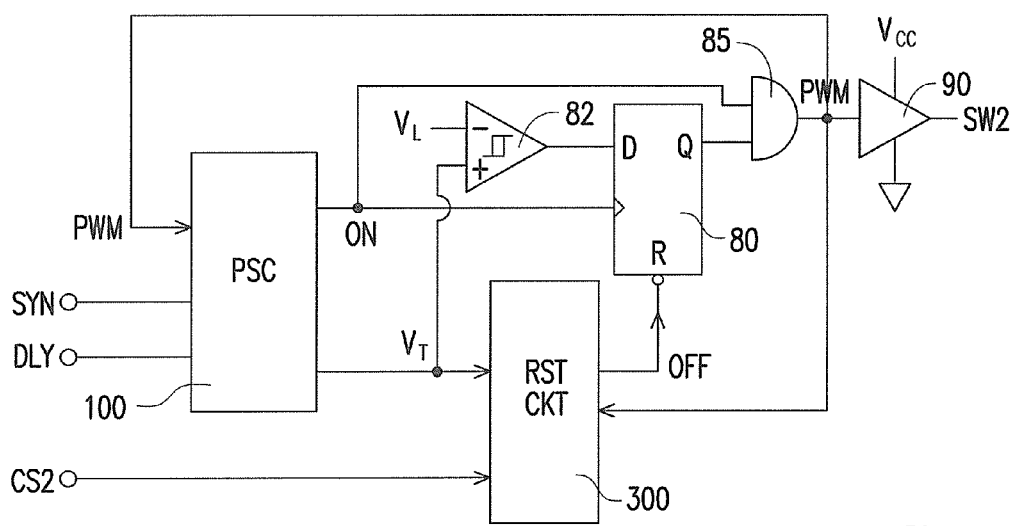
FIG. 2 shows a switching controller according to the present invention.

FIG. 2 shows an embodiment of the switching controller 50 according to the present invention, which includes a power-sharing circuit 100 connected to the input terminal SYN for receiving the input signal $S_{YN}$. The input signal $S_{YN}$ is the output signal of previous switching controller, such as the switching controller 10. The power sharing circuit 100 is also coupled to a delay terminal DLY to receive a delay current $I_{DLY}$. The resistor 59 determines the delay current $I_{DLY}$. The power-sharing circuit 100 is used to generate a phase-shift signal ON and an integration signal $V_T$ in response to the input signal $S_{YN}$. The phase-shift signal ON is generated after a delay time $T_{DLY}$ when the input signal $S_{YN}$ is enabled. The delay current $I_{DLY}$ determines the delay time $T_{DLY}$. The integration signal $V_T$ is produced in accordance with the pulse width of the input signal $S_{YN}$.

The integration signal $V_T$ is further coupled to a comparator 82. The comparator 82 includes a threshold $V_L$. The output of the comparator 82 is connected to enable a flip-flip 80. The phase-shift signal ON is coupled to set the flip-flip 80. The flip-flop 80 and an AND gate 85 form a control circuit to generate a switching signal PWM at the output of the AND gate 85. Once the integration signal $V_T$ is lower than the threshold $V_L$, the switching signal PWM will be disabled in response to the clocking of the phase-shift signal ON. Inputs of the AND gate 85 are connected to the output of the flip-flop 80 and the phase-shift signal ON. The flip-flop 80 is reset by a reset signal OFF. A reset circuit 300 is developed to generate the reset signal OFF in accordance with the integration signal $V_T$. Furthermore, the reset circuit 300 is connected to the current-sense terminal CS2 for the generation of the switching signal PWM. The switching signal PWM is coupled to an output terminal SW2 of the switching controller 50 through a drive circuit 90.

Figure 3:
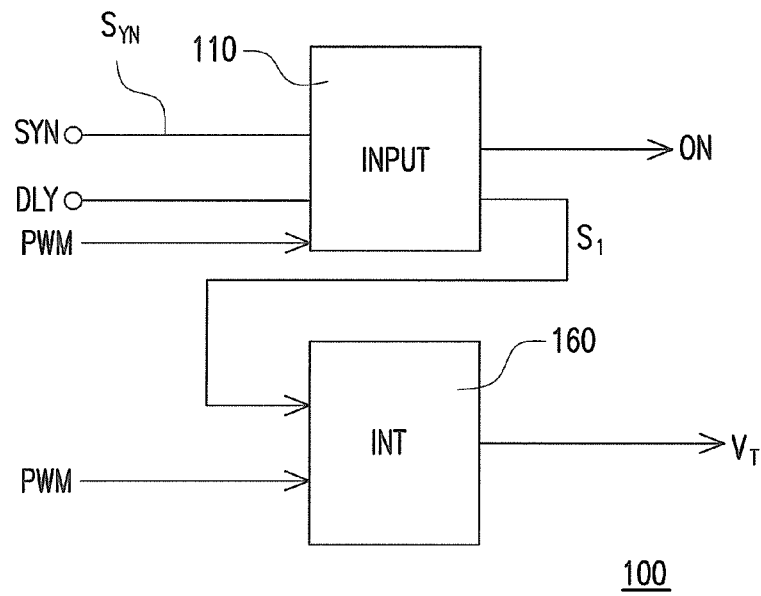
FIG. 3 shows a power sharing circuit of the switching controller according to the present invention.

FIG. 3 shows the power sharing circuit 100. It includes an input circuit 110 and an integration circuit 160. The input circuit 110 is coupled to the input terminal SYN and the delay terminal DLY to receive the input signal $S_{YN}$ and the delay current $I_{DLY}$ for generating the phase-shift signal ON and an input-shaping signal $S_1$. The input-shaping signal $S_1$ is connected to the integration circuit 160. The integration circuit 160 generates the integration signal $V_T$ in response to the input-shaping signal $S_1$ and the switching signal PWM.

Figure 4:
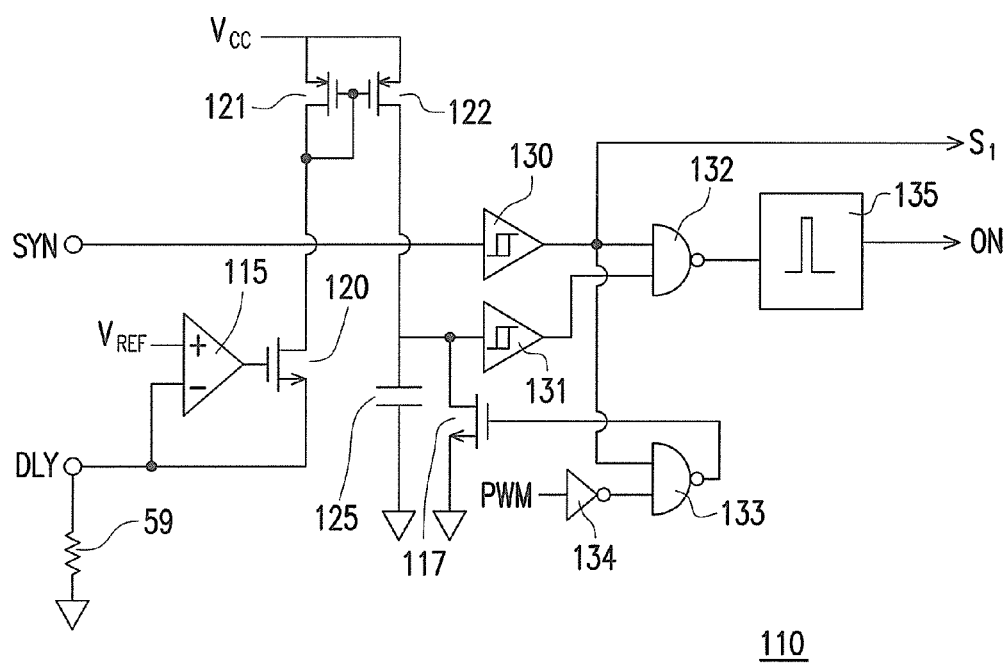
FIG. 4 is an embodiment of an input circuit according to the present invention.

FIG. 4 is an embodiment of the input circuit 110 according to the present invention. A buffer gate 130 is connected to the input terminal SYN to receive the input signal $S_{YN}$. The buffer gate 130 generates the input-shaping signal $S_1$ in response to the input signal $S_{YN}$. The input-shaping signal $S_1$ will be enabled (logic-high) when the input signal $S_{YN}$ is higher than the threshold voltage of the buffer gate 130. An operational amplifier 115 having a positive input connected to a reference voltage $V_{REF}$. The negative input of the operational amplifier 115 is coupled to the delay terminal DLY. The operational amplifier 115 associates with a transistor 120 to generate a current $I_{120}$ in accordance with the resistance of the resistor 59. Transistors 121 and 122 form a current mirror to generate a current $I_{122}$ in accordance with the current $I_{120}$. The current $I_{122}$ is connected to charge the capacitor 125. The input of a buffer gate 131 is connected to the capacitor 125. The output of the buffer gate 131 is connected to an input of a NAND gate 132. Another input of the NAND gate 132 is connected to the input-shaping signal $S_1$. The output of the NAND gate 132 is coupled to generate the phase-shift signal ON through a pulse generator 135. The delay time $T_{DLY}$ is thus generated between the enabling of the input signal $S_{YN}$ and the enabling of the phase-shift signal ON. The resistor 59 determines the current $I_{120}$ and the current $I_{122}$. The current $I_{122}$ and the capacitance $C_{125}$ of the capacitor 125 determine the delay time $T_{DLY}$.

A transistor 117 is connected to the capacitor 125 to discharge the capacitor 125. A NAND gate 133 is applied to control the on/off state of the transistor 117. The first input of the NAND gate 133 is the input-shaping signal $S_1$. The second input of the NAND gate 133 is connected to the switching signal PWM via an inverter 134. Therefore, the capacitor 125 is discharged once the input-shaping signal $S_1$ is disabled or the switching signal PWM is enabled.

Figure 5:
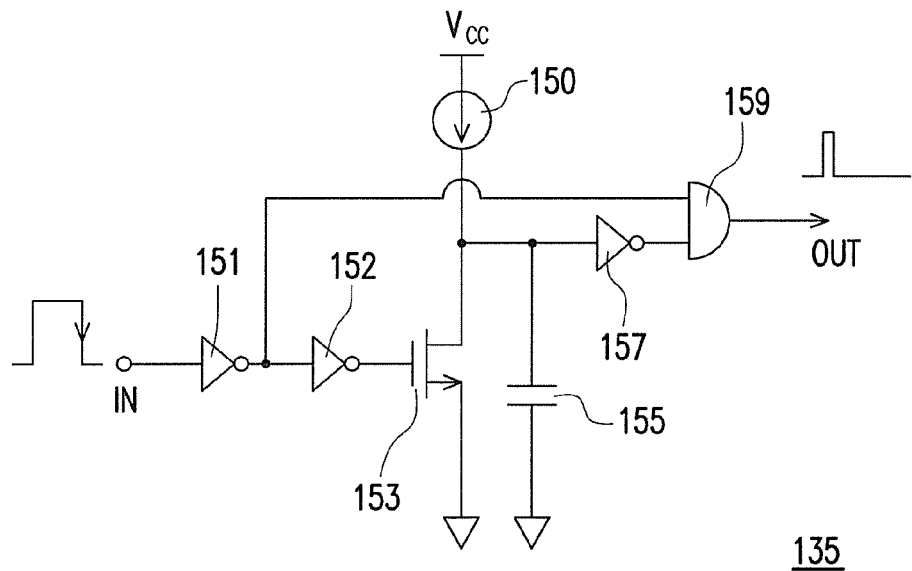
FIG. 5 shows a circuit schematic of a pulse generator.

FIG. 5 shows the circuit schematic of pulse generators. An inverter 151 is connected to the input of the pulse generator to receive an input of the pulse generator. The output of the inverter 151 is coupled to control a transistor 153 through an inverter 152. A capacitor 155 is connected in parallel with the transistor 153. A current source 150 is coupled to charge the capacitor 155. An inverter 157 is connected to the capacitor 155. The output of the inverter 155 is connected to an AND gate 159. Another input of the AND gate 159 is connected to the output of the inverter 151. The output of the AND gate 159 is connected to the output of the pulse generator. Therefore, the pulse generator generates a pulse in response to the falling edge of the input of the pulse generator. The current $I_{150}$ of the current source 150 and the capacitance $C_{155}$ of the capacitor 155 determine the pulse width of the pulse.

Figure 6:
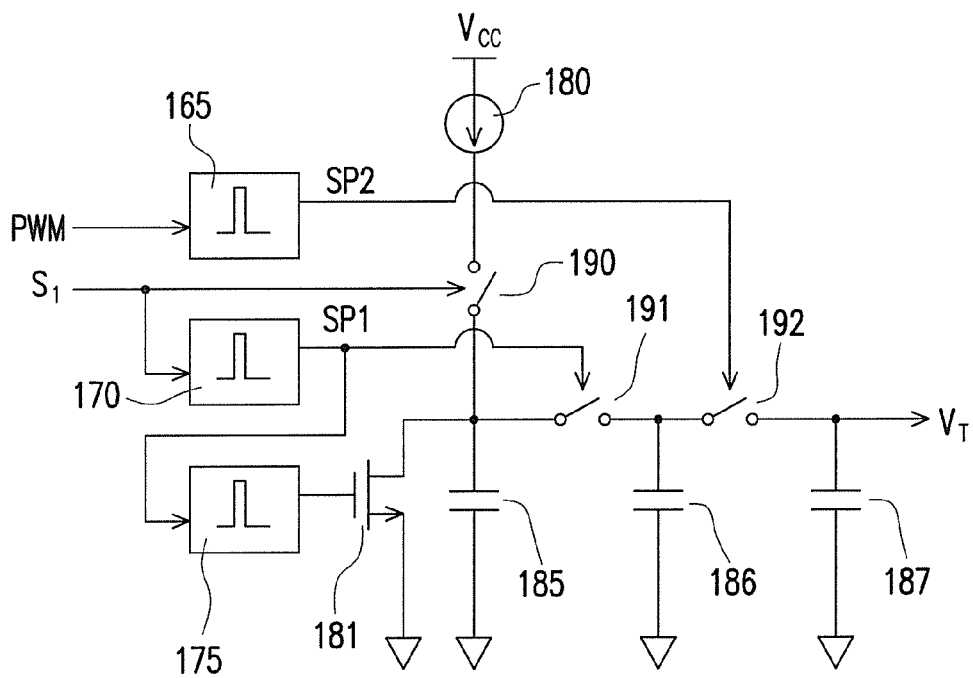
FIG. 6 shows an integration circuit according to the present invention.

FIG. 6 shows an embodiment of the integration circuit 160 according to the present invention. A current source 180 is connected to charge a capacitor 185 through a switch 190. The switch 190 is controlled by the input-shaping signal $S_1$. A capacitor 186 is coupled to the capacitor 185 via a switch 191. The switch 191 is controlled by a first-sample signal SP1. A capacitor 187 is coupled to the capacitor 186 through a switch 192 to generate the integration signal $V_T$. The switch 192 is controlled by a second-sample signal SP2. The second-sample signal SP2 is generated by the switching signal PWM through a pulse generator 165. A pulse generator 170 is used to generate the first-sample signal SP1 in response to the input-shaping signal $S_1$. A transistor 181 is connected to discharge the capacitor 185 in response to the end of the first-sample signal SP1. The first-sample signal SP1 is coupled to control the transistor 181 through a pulse generator 175. Therefore, the pulse width $T_{ON1}$ of the input signal $S_{YN}$, the current $I_{180}$ of the current source 180 and the capacitance $C_{185}$ of the capacitor 185 determine the level of the integration signal $V_T$.

$$V_T = \frac{I_{180}}{C_{185}} \times T_{ON1} \quad (8)$$

Figure 7:
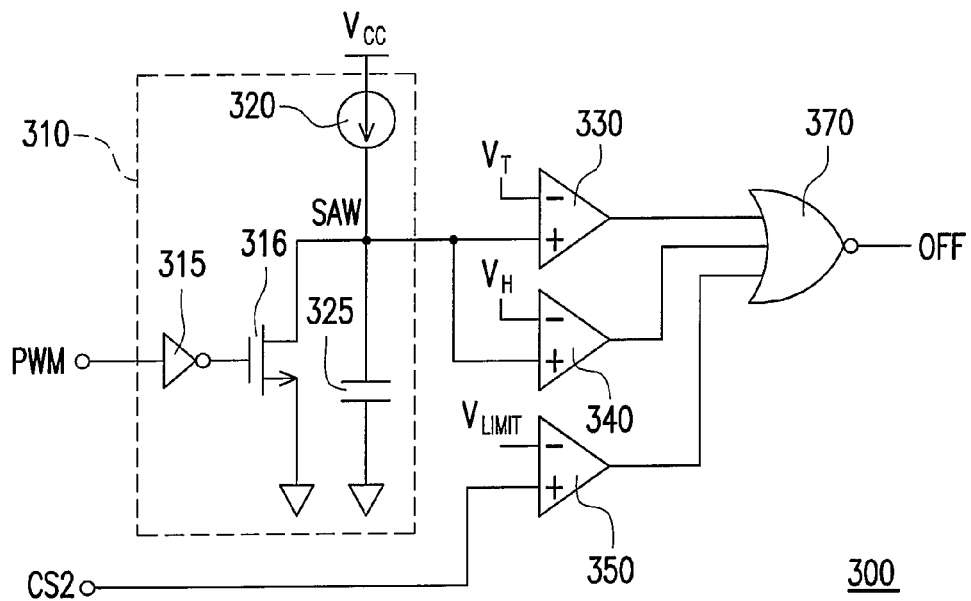
FIG. 7 shows a reset circuit according to the present invention.

FIG. 7 shows an embodiment of the reset circuit 300 according to the present invention. The reset circuit 300 includes a second integration circuit 310, comparators 330, 340 and 350, and a NOR gate 370. The second integration circuit 310 contains a current source 320, a capacitor 325, a transistor 316 and an inverter 315. The switching signal PWM is connected to the inverter 315. The output of the inverter 315 is coupled to discharge the capacitor 325 through the transistor 316. The current source 320 is coupled to charge the capacitor 325 once the switching signal PWM is enabled. A second integration signal SAW is generated in response to the enabling of the switching signal PWM. The second integration signal SAW is connected to the comparator 330 to compare with the integration signal $V_T$. The output of the comparator 330 is coupled to generate the reset signal OFF through the NOR gate 370. Therefore, the switching signal PWM will be disabled once the second integration signal SAW is higher than the integration signal $V_T$. The pulse width $T_{ON2}$ of the switching signal PWM can be expressed by the following equation:

$$T_{ON2} = \frac{C_{325}}{I_{320}} \times V_T \qquad (9)$$

where the $C_{325}$ is the capacitance of the capacitor 325; and $I_{320}$ is the current of the current source 320.

Considering equation 8, the equation 9 can be written as, $$T_{ON2} = \frac{C_{325}}{I_{320}} \times \frac{I_{180}}{C_{185}} \times T_{ON1} \qquad (10)$$

selecting the capacitance $C_{325}$ correlated to the capacitance $C_{185}$ and setting the current $I_{320}$ correlated to the current $I_{180}$. The pulse width $T_{ON2}$ of the switching signal PWM will be same as the pulse width $T_{ON1}$ of the input signal $S_{YN}$. Therefore, the integration signal $V_T$ is generated which is proportional to the pulse width $T_{ON1}$ of the input signal $S_{YN}$. The pulse width $T_{ON2}$ of the switching signal PWM is produced which is proportional to the integration signal $V_T$.

The second input of the NOR gate 370 is connected to the output of the comparator 340. A trip-point signal $V_H$ is connected to the negative input of the comparator 340. The positive input of the comparator 340 is coupled to the second integration signal SAW. The reset signal OFF will be generated to turn off the switching signal PWM once the second integration signal SAW is higher than the trip-point signal $V_H$. Therefore, the maximum on time of the switching signal PWM is limited. The third input of the NOR gate 370 is connected to the output of the comparator 350. A limit signal $V_{LIMIT}$ is connected to the negative input of the comparator 350. The positive input of the comparator 350 is coupled to receive a current-sense signal from the current-sense terminal CS2. The reset signal OFF will be generated to turn off the switching signal PWM once the current-sense signal of the current-sense terminal CS2 is higher than the limit signal $V_{LIMIT}$. The limit signal $V_{LIMIT}$ provides a limited value to restrict the switching current of the transistor 52. Therefore, the switching signal PWM is disabled once the switching current of the transistor 52 is higher than a limited value.

Figure 8:
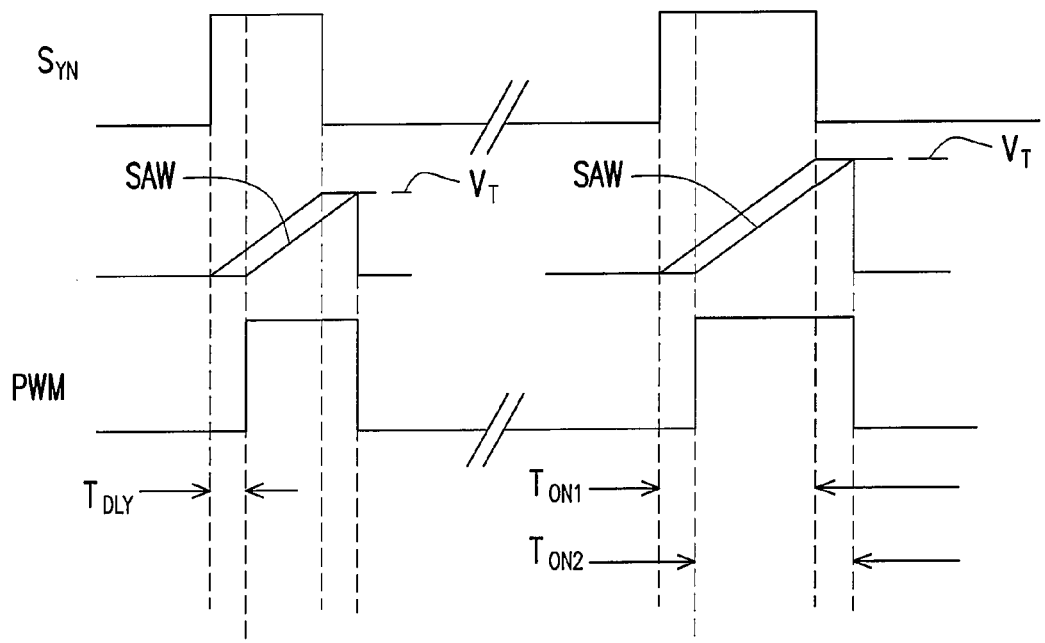
FIG. 8 shows key waveforms of the switching controller according to the present invention.

FIG. 8 shows waveforms of the input signal $S_{YN}$ and the switching signal PWM. The input signal $S_{YN}$ is coupled to generate the switching signal PWM after the delay time $T_{DLY}$. The integration signal $V_T$ is generated in accordance with the pulse width $T_{ON1}$ of the input signal $S_{YN}$. Once the switching signal PWM is generated, a second integration signal SAW will be generated accordingly. The switching signal PWM will be disabled once the second integration signal SAW is higher than the integration signal $V_T$. The pulse width $T_{ON2}$ of the switching signal PWM is thus generated same as the pulse width $T_{ON1}$ of the input signal $S_{YN}$. The power sharing is consequently achieved for parallel power converters.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims or their equivalents.

What is claimed is:

1. A switching controller for power converters, comprising:
   an input circuit, coupled to an input terminal, for receiving an input signal, and configured for receiving a switching signal for generating a phase-shift signal;
   a control circuit, coupled to the input circuit, the control circuit generates the switching signal and the power converters are switched according to the switching signal, wherein the control circuit comprises a flip-flop and an AND gate for receiving the phase-shift signal and generating the switching signal at an output terminal of the AND gate;
   a resistor, coupled to the input circuit for determining a delay time, wherein the switching signal is generated in response to the input signal, wherein the delay time is the time from a low-to-high transition of the input signal to when the phase-shift signal is allowed to be output, and a pulse width of the switching signal is determined by a pulse width of the input signal; and
   an integration circuit, for generating an integration signal in response to the pulse width of the input signal, wherein the switching signal is disabled once a voltage level of the integration signal is lower than a predetermined threshold voltage supplied to a comparator in the switching controller, wherein an output terminal of the comparator is further coupled to an input terminal of the flip-flop for controlling the switching signal.

2. The switching controller as claimed in claim 1, wherein the switching signal is disabled once the switching current of a power transistor of the power converters is higher than a predetermined limited value, wherein a gate terminal of the power transistor is coupled to the control circuit through a drive circuit in the switching controller for receiving the switching signal.

3. The switching controller as claimed in claim 1, wherein a maximum on time of the switching signal is limited.

4. A switching controller for power converters, comprising:
   an input circuit, coupled to an input terminal, for receiving an input signal, and configured for receiving a switching signal, wherein the input circuit is further coupled to a delay terminal for receiving a delay current to generate a phase-shift signal;
   a control circuit, coupled to the input circuit, the control circuit generates the switching signal, and the power converters are switched according to the switching signal, wherein a pulse width of the switching signal is correlated to a pulse width of the input signal, and the control circuit comprises a flip-flop and an AND gate for receiving the phase-shift signal to generate the switching signal at an output terminal of the AND gate; and an integration circuit, for generating an integration signal in response to the pulse width of the input signal, wherein the switching signal is disabled once a voltage level of the integration signal is lower than a predetermined threshold voltage supplied to a comparator in the switching controller, wherein an output terminal of the comparator is further coupled to an input terminal of the flip-flop.

5. The switching controller as claimed in claim 4, further comprising a resistor to program a delay time, wherein the delay time is the time from a low-to-high transition of the input signal to when the phase-shift signal is allowed to be output.

6. The switching controller as claimed in claim 4, wherein the switching signal is disabled once the switching current of a power transistor of the power converters is higher than a predetermined limited value, wherein a gate terminal of the power transistor is coupled to the control circuit through a drive circuit in the switching controller for receiving the switching signal.

7. The switching controller as claimed in claim 4, wherein a maximum on time of the switching signal is limited.

* * * * *